United States Patent
Möller et al.

(10) Patent No.: US 6,857,068 B1
(45) Date of Patent: Feb. 15, 2005

(54) SYSTEM AND METHOD FOR DATA PROCESSING BY EXECUTING A SECURITY PROGRAM ROUTINE INITIALLY STORED IN A PROTECTED PART OF IRREVERSIBLY BLOCKED MEMORY UPON START-UP

(75) Inventors: Bernd Möller, Weiherwiesen (DE);
Harro Osthoff, Ziegelsteinstrasse (DE);
Ben Smeets, Dalbackavägen (SE);
Kar-Fat Poon, Mellan-Grevie (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 435 days.

(21) Appl. No.: 09/598,173

(22) Filed: Jun. 21, 2000

(30) Foreign Application Priority Data

Jun. 25, 1999  (EP) .............................................. 99111962

(51) Int. Cl.⁷ .............................................. G06F 9/445

(52) U.S. Cl. .............................. 713/2; 713/1; 713/100; 713/151; 713/182; 713/183; 713/200; 380/247; 380/249; 380/255

(58) Field of Search ............................... 713/1, 2, 100, 713/151, 182, 183, 200; 380/247, 249, 255; 711/1, 152, 163

(56) References Cited

U.S. PATENT DOCUMENTS

| | | | | |
|---|---|---|---|---|
| 4,811,293 A | * | 3/1989 | Knothe et al. | 365/195 |
| 4,933,898 A | * | 6/1990 | Gilberg et al. | 365/53 |
| 4,975,870 A | * | 12/1990 | Knicely et al. | 711/152 |
| 5,007,082 A | * | 4/1991 | Cummins | 713/164 |
| 5,083,293 A | | 1/1992 | Gillberg | |
| 5,293,610 A | * | 3/1994 | Schwarz | 711/164 |
| 5,319,765 A | * | 6/1994 | Kimura | 711/164 |
| 5,355,498 A | | 10/1994 | Provino et al. | |
| 5,363,334 A | * | 11/1994 | Alexander et al. | 365/185.04 |
| 5,394,367 A | * | 2/1995 | Downs et al. | 365/195 |
| 5,546,561 A | * | 8/1996 | Kynett et al. | 711/163 |
| 5,592,641 A | | 1/1997 | Fandrich et al. | |
| 5,630,057 A | * | 5/1997 | Hait | 713/200 |
| 5,828,831 A | * | 10/1998 | Kong | 713/200 |
| 5,844,986 A | * | 12/1998 | Davis | 713/187 |
| 5,892,906 A | * | 4/1999 | Chou et al. | 713/202 |
| 5,900,606 A | * | 5/1999 | Rigal et al. | 235/375 |
| 5,917,168 A | * | 6/1999 | Nakamura et al. | 235/379 |
| 5,923,759 A | * | 7/1999 | Lee | 713/159 |
| 5,954,817 A | * | 9/1999 | Janssen et al. | 713/200 |
| 5,991,849 A | * | 11/1999 | Yamada et al. | 711/103 |
| 6,009,495 A | * | 12/1999 | DeRoo et al. | 711/103 |
| 6,199,163 B1 | * | 3/2001 | Dumas et al. | 713/183 |
| 6,308,265 B1 | * | 10/2001 | Miller | 713/2 |

(List continued on next page.)

FOREIGN PATENT DOCUMENTS

| | | | |
|---|---|---|---|
| EP | 0 524 719 A | | 1/1993 |
| GB | 2320855 A | * | 1/1998 |
| GB | 2320855 A | | 7/1998 |

OTHER PUBLICATIONS

*Communications of the Association for Computing Machinery,* US. Association for Computing Machinery, New York, vol. 37, No. 11, pp. 66–70, and 94, XP000485634, "BITS: A Smartcard Protected Operating System".

*Components,* DE, Diemens Aktiengesellschaft, Munchen, G. Krings, vol. 6, No. 1, pp. 13–17, XP000446879, ISSN: 0945–1137, "Intelligent Memory Chips for Smart Cards".

*Primary Examiner*—Lynne H. Browne
*Assistant Examiner*—Nitin Patel
(74) *Attorney, Agent, or Firm*—Nixon & Vanderhye P.C.

(57) ABSTRACT

Device for processing data includes a processor for executing program routines, and a memory for storing program routines to be executed by the processor. Part of the memory includes a protected part from which data can be read but which is protected against being written into. The processor is arranged to necessarily execute a program routine stored in the protected part of the memory upon start-up.

28 Claims, 6 Drawing Sheets

U.S. PATENT DOCUMENTS

| | | | |
|---|---|---|---|
| 6,401,160 B1 * | 6/2002 | See et al. | 711/5 |
| 6,401,208 B2 * | 6/2002 | Davis et al. | 713/193 |
| 6,564,318 B1 * | 5/2003 | Gharda et al. | 713/2 |
| 6,591,251 B1 * | 7/2003 | Leon et al. | 705/60 |
| 6,725,382 B1 * | 4/2004 | Thompson et al. | 713/202 |
| 6,763,465 B1 * | 7/2004 | Kelley et al. | 713/200 |
| 2001/0044886 A1 * | 11/2001 | Cassagnol et al. | 711/163 |

* cited by examiner

SYSTEM AND METHOD FOR DATA PROCESSING BY EXECUTING A SECURITY PROGRAM ROUTINE INITIALLY STORED IN A PROTECTED PART OF IRREVERSIBLY BLOCKED MEMORY UPON START-UP

FIELD OF THE INVENTION

The present invention relates to a device for processing data and a method for controlling such a device.

BACKGROUND OF THE INVENTION

The use of data processing systems comprising processing elements and memory elements have become widespread in very different fields of electronics. In the field of communication, most communication devices contain processors that execute programs stored in appropriate memory devices, to thereby process data stored in the same memory devices or somewhere else. A typical example of a communication device containing a processor (typically a microprocessor controller) and appropriate memory chips is a mobile telephone.

One of the problems encountered with data processing systems is that of data security. For example, the above-mentioned mobile phone may contain different types of memories separated from the central processor, such as a flash memory or an EEPROM. It is possible that an EEPROM is emulated by a flash memory or is partly a flash memory. Such memories typically have to be protected against unauthorized access, in order to safeguard the normal operation of the mobile telephone.

Naturally, the problem of data security occurs in any such data processing system, not only in mobile phones. The basic solution to problems of data security is the provision of protection software, e.g. an algorithm for the authentication of sensitive data in the EEPROM or emulated EEPROM. However, such software solutions suffer from a number of problems that cannot be overcome by software itself, such as the possibility of switching off the authentication algorithm or modifying the authentication algorithm. Sometimes, it is also possible to circumvent an authentication algorithm by using older software that did not contain the authentication routine but still provides access to the sensitive data.

SUMMARY OF THE INVENTION

The object of the present invention is to provide a better device for data processing, which is fairly simple to implement and solves the above problems.

This object is achieved by the device described in claim 1 and the method described in claim 14.

In accordance with the present invention, in a data processing device having a memory means and a processing means, there is provided on the one hand a protected section in the memory means of a data processing device, and on the other hand the processing means in is arranged to necessarily execute a program routine stored in the protected part of the memory upon start-up. Due to this arrangement, specific programs that are e.g. associated with security can be executed, where an unauthorized person is prevented from performing changes in said programs, because they are stored in a protected part of the memory. Such security programs can e.g. be programs that establish that other data has not been tampered with, as shall be explained in more detail further on.

An important aspect of the present invention is the fact that no modification of the processor is necessary. In other words, the straightforward solution to the above-mentioned problems would have consisted in modifying the processing means to thereby contain security mechanisms, but such a modification of a processor is typically complicated, time consuming and costly. In contrast thereto, the present invention provides a very simple arrangement, in which only a modified memory is necessary, which is far simpler. Especially, processors already in use may be retained, in which case the memories have to be arranged in such a way that the addresses fixed in said processors for start-up (so-called start addresses) point to the protected section of the memory devices. As an alternative, a slight modification of the processors could be performed, namely changing the start addresses. Although this is a modification of the processor, it is fairly simple and not costly.

Preferred embodiments of the invention are described in the dependent claims.

BRIEF DESCRIPTION OF DRAWINGS

The various advantages and features of the present invention will become more apparent by studying the following detailed description of embodiments of the invention, where said description makes reference to the figures, in which.

DETAILED DESCRIPTION OF EMBODIMENTS

Figure 1:
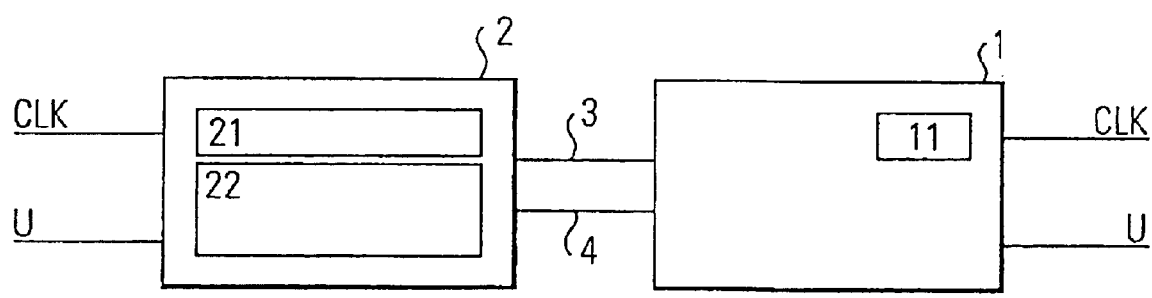
FIG. 1 shows a basic arrangement of an embodiment of the present invention.

FIG. 1 shows an embodiment of the present invention. Reference numeral 1 refers to a processor, such as a microprocessor controller. Reference numeral 11 symbolizes start addresses in said processor, where said start addresses are implemented in such a way that they cannot be changed from the outside. In other words, the processor 1 is arranged in such a way that it necessarily calls the start-addresses stored in section 11 when the processor is started.

Reference numeral 2 is a memory system comprising a first section 21, which is a protected section, and a second section 22, in which data may freely be written. The processor 1 and memory 2 are connected by address lines 3 and data lines 4, and CLK symbolizes that the circuits are supplied with a clock signal, while U symbolizes that the circuits are supplied with an operating voltage.

The protected section is protected against data being written into it. This may be accomplished in any way suitable or desirable for the application at hand.

Figure 4:
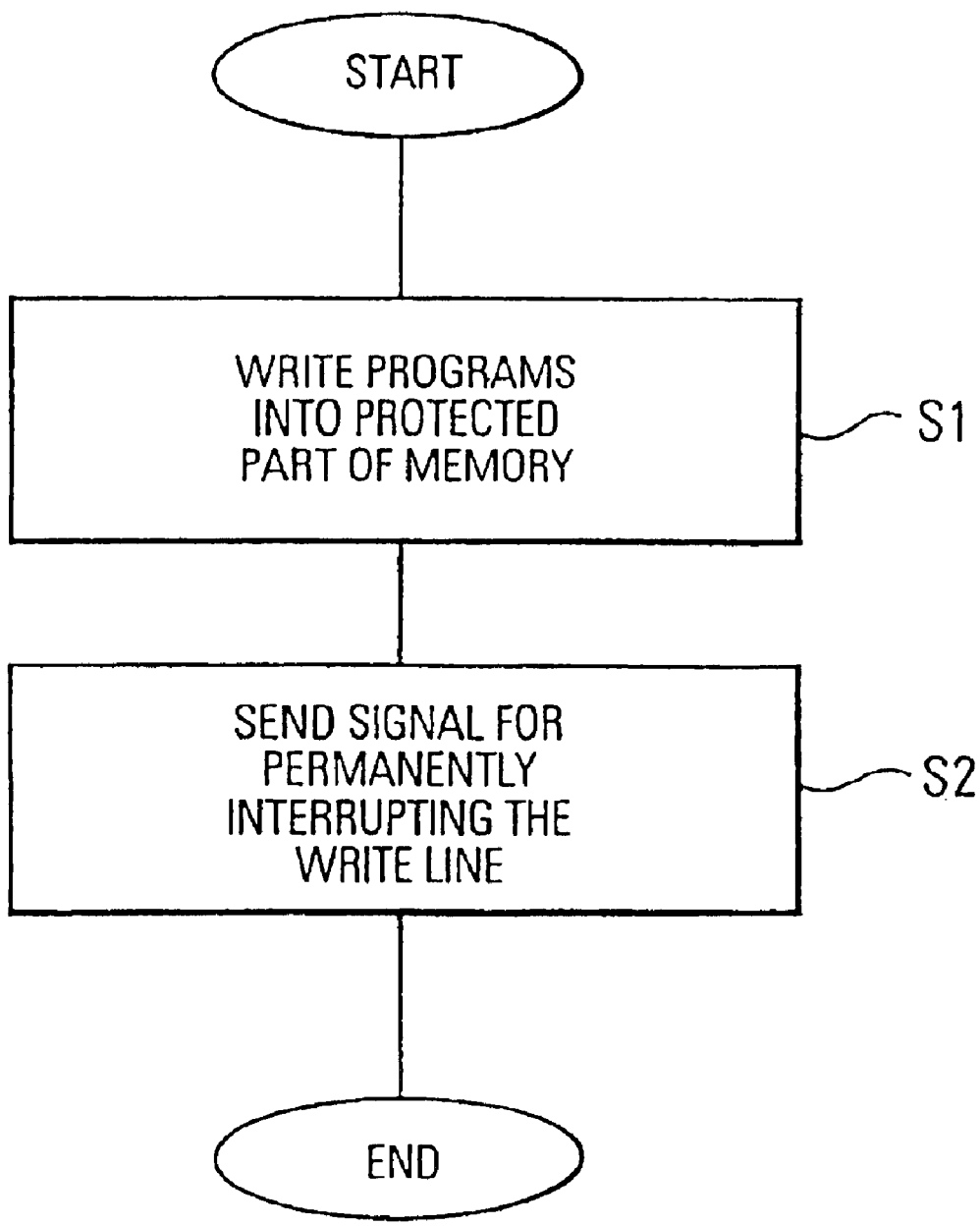
FIG. 4 shows a flow-chart of a process for storing data in the protected part and subsequently protecting said data.

The protected section 21 is preferably arranged in such a way that it is not at all possible to write data into said section after an initial storing of data in said section has taken place. In other words, the memory must be arranged in such a way that specific data or program routines can be stored in the protected section 21 initially, and then a mechanism must be used for ensuring that no subsequent writing of data into said section is possible. One preferred embodiment of a memory accomplishes this in a way shown in FIG. 4. In this case, a so-called one-time programming area is provided in a flash memory device, where this flash memory device incorporates a mechanism for making a write line to the protected section impassable (e.g. destroying the write line by burning it through, so-called fusable link). The destruction of the write line is performed by the memory in response to a predetermined signal. In this way, the necessary programs and data can be written into the protected section (step S1 in FIG. 4) by the manufacturer of the apparatus into which the data processing device of the invention is to be built-in (i.e. the manufacturer of mobile telephones), after which the predetermined signal is sent to thereby burn-through the write line (fusable link). As a consequence, no subsequent writing of data into the protected section is possible, such that the data in said section cannot be changed. (Step S2 in FIG. 4).

Naturally, this is only a preferred example, and the present invention extends to any type of memory device, in which it is possible to protect a specified part of the memory from write access. As an example, memories are known, in which a certain number of input lines are given, where a predetermined part of the memory is protected from write access as long as certain predetermined signals (such as a ground voltage 0 or a supply voltage) are present on the input lines.

Figure 6:
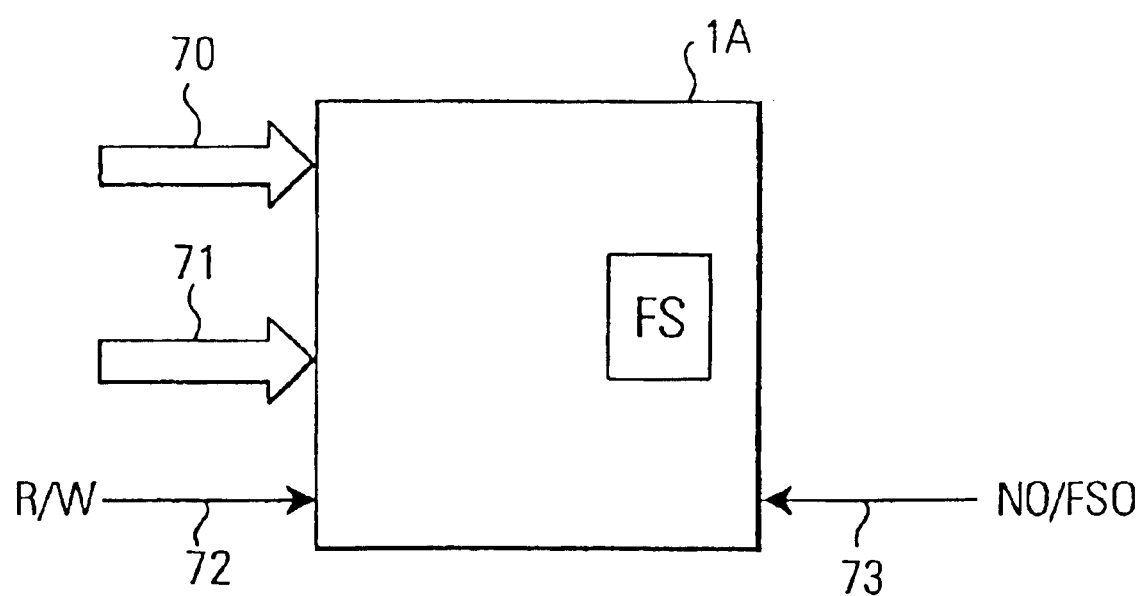
FIG. 6 is a schematic diagram of an embodiment of a memory means.

Another example will be explained in connection with FIG. 6, which shows a memory with a so-called finite state machine FS. Finite state machines are known in the art, and will therefore only briefly be described here. The depicted memory 1A has an address bus 70, a data bus 71, read/write (R/W) access line 72, and a line 73 for switching the states of the finite state machine (FS). NO symbolizes normal operation, and is FSO symbolizes finite state operation. The finite state machine is basically a program that is hard-wired into the memory 1A, such th at it cannot be changed from the outside, thereby fulfilling basic security requirements. This hard-wired program is part of the address logic that processes the addresses sent to the memory over the address bus.

As an example, if line 73 is high (i.e. 1), then the memory is in a normal state of operation and the data bus 71 is used in the normal fashion for transporting data. If line 73 is low (i.e. 0), then the data bus is used for controlling the finite state machine FS.

In the application to the present invention, the finite state machine will have two states, namely a first state in which it is allowed to write data into a predetermined section of the memory 1A (i.e. this section-will be the protected section), and a second state, which is a locked state, in which writing into the predetermined section is disabled. The finite state machine is arranged such that the transition from the first state to the second state is irreversible, i.e. once the machine is locked, it is no longer possible to switch back to the first state, and therefore it is no longer possible to write into the protected section. This can be done in any suitable way with known finite state machines, for example by selecting the finite state program such that the locked state depends on a specific value in the protected section, such that as long as the initial value is at the specific address a writing into the protected section is allowed, whereas once the value at the specific address has changed (this is the state transition), the finite state program will go into an endless loop or terminate if an attempt is made to write into an address in the protected section, and because the specific address is in the protected section, it may not be changed, so that the locked state is permanent.

Figure 5:
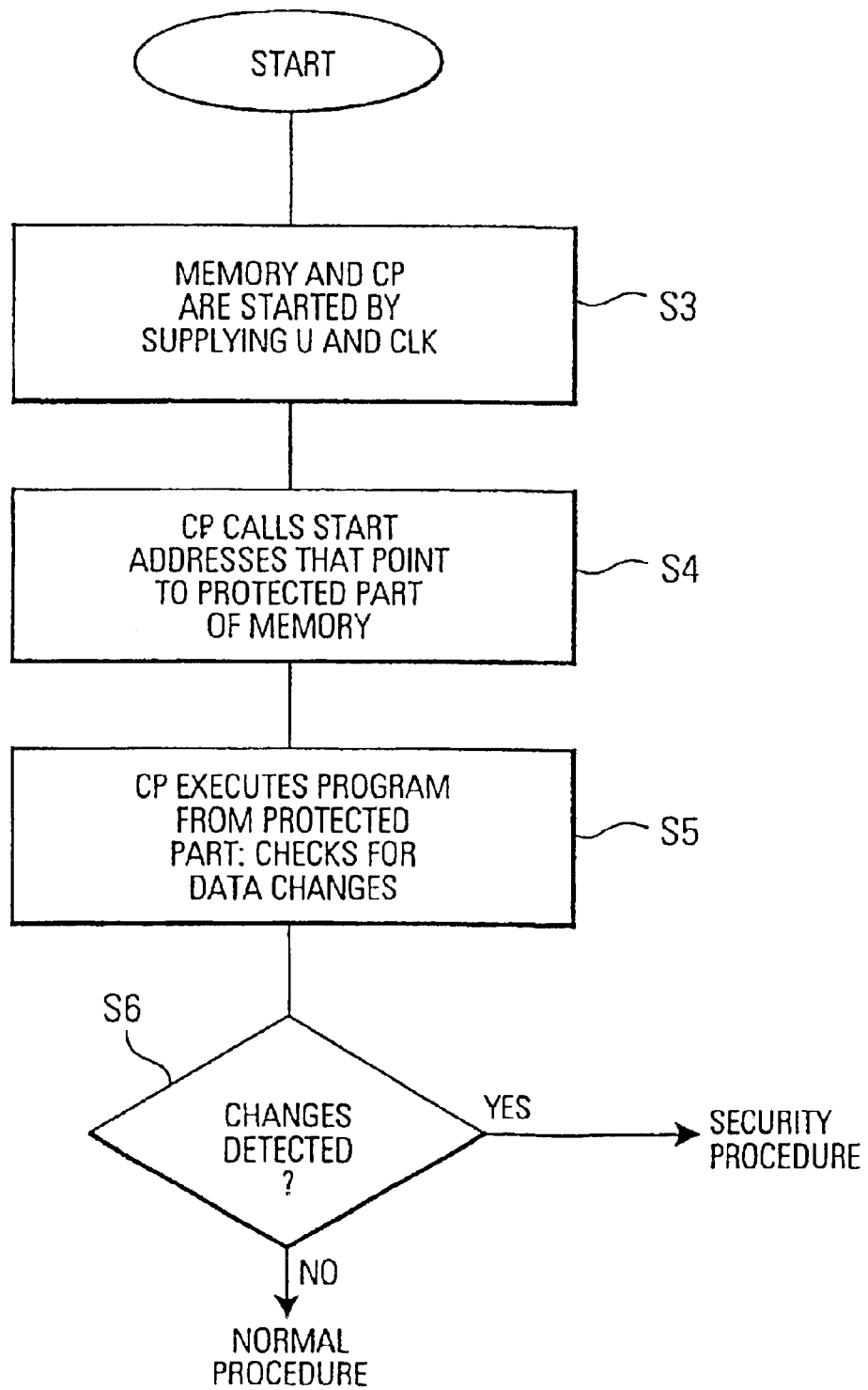
FIG. 5 is a flow-chart explaining the basic operation of the data processing device of the present invention.

Returning now to FIG. 1, the system is arranged in such a way that the addresses contained in section 11 of processor 1 point towards the protected section 21 in memory 2. In other words, upon start-up, the processor 1 will call one or more addresses in the protected part 21 of memory 2, and consequently execute the programs contained therein. This is explained in the top-part of FIG. 5, which shows a flow chart of the control operation in accordance with the present invention. In a first step S3, the memory and processor CP are started by supplying voltage U and a clock signal CLK. Then, in step S4, the processor CP calls the start addresses that point to the protected part of the memory. Finally, in step S5, the processor CP executes the programs from the protected part.

It may be noted that it is not necessary for specific programs to be stored in the protected part 21 of memory 2, because in the event of the processor 1 already being programmed, it may be sufficient that the processor only calls up specific parameters stored in the protected section 21, where these parameters are then processed by the processor 1 in the preprogrammed routines.

The precise processing conducted upon start-up can be selected in accordance with the specific requirements and desires of the given application. In accordance with a preferred embodiment, the routines carried-out upon start-up are security routines, for example shown in the bottom part of the flow-chart in FIG. 5. More specific ally, in the case of FIG. 5, the program routine executed upon start-up checks for unauthorized changes of data in the unprotected section 22 of memory 2.

As an example, in the event that the data processing device of the present invention is employed in a mobile telephone, then certain parameters associated with the specific user of said mobile telephone (such as service, priorities, etc.) can be stored in said unprotected section 22, where it is possible that these parameters are changed during the routine processing performed by processor 1. However, it will also be possible that an unauthorized user will access these data and change them. One possibility of checking for such an unauthorized access consists in additionally storing a characterizing parameter for the data in said unprotected section 22 together with any changed parameters. A typical example of such a characterizing parameter is the check sum. Another example is a result of a computation of a cryptographic hash function. In other words, every time that the authorized entity (the processor) changes data in section 22, then an accordingly changed check sum is also stored. In this way, the routine for checking if unauthorized access and changes have been performed can consist in calculating the check sum and comparing said check sum to the stored value. If a discrepancy occurs, then the routine determines that an unauthorized change of data has taken place. As shown in the bottom part of FIG. 5, the routine can react to the detection of an unauthorized change (yes in step S6) by invoking any sort of desired security or emergency procedure (such as shutting-off the device), or if no changes are detected, proceeding with normal operation.

Figure 2:
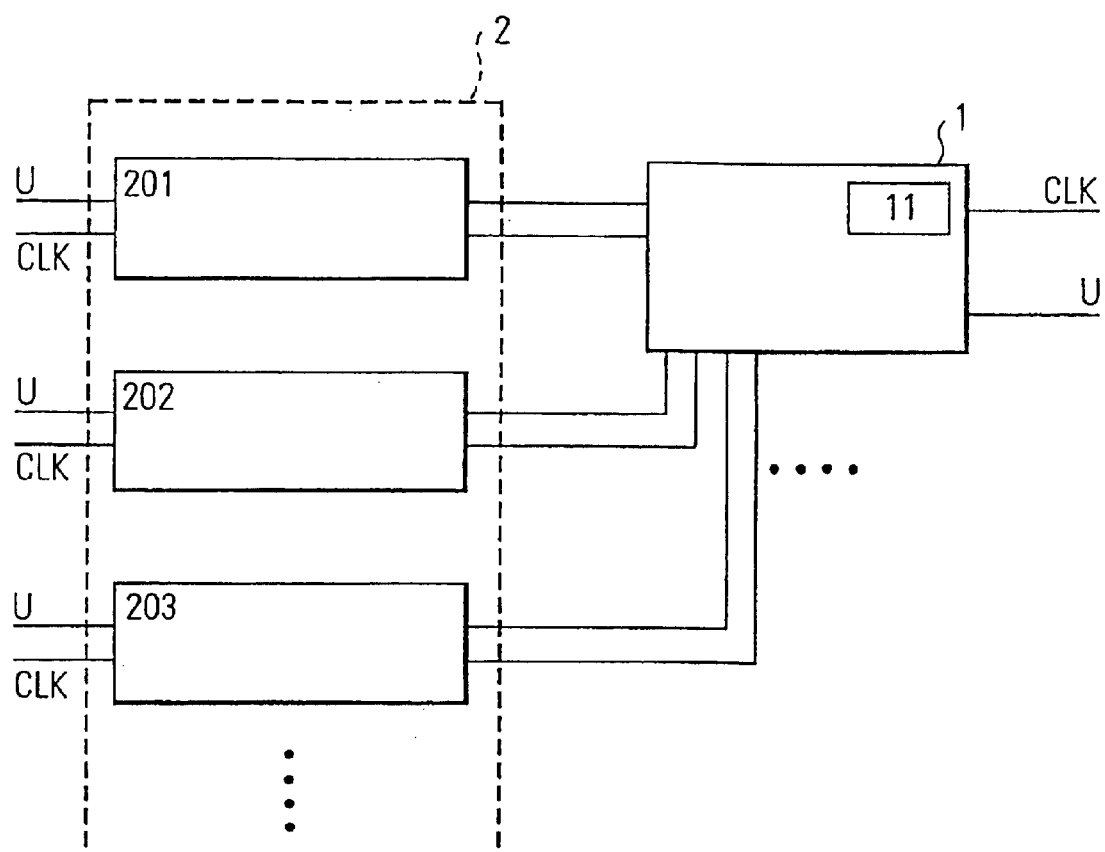
FIG. 2 shows an arrangement of another embodiment of the present invention.

Although the memory 2 shown in FIG. 1 appears as a single unit, this is to be understood as an abstract description, as said memory may be a single unit, but can equally well consist of a plurality of physically separate memory-devices, as e.g. shown in FIG. 2. FIG. 2 uses the same reference numerals for components already described in connection with FIG. 1, so that a repeated description is not necessary. As shown in FIG. 2, memory 2 comprises a plurality of memory devices, such as individual memory chips 201, 202, 203 . . . The precise arrangement of the memory devices or chips is of no importance to the present invention. For example, it is possible that the protective section shown as 21 in FIG. 1 is formed by the entire chip 201 in FIG. 2, i.e. this chip 201 is arranged in such a way that there is no write access. Then the remaining chips 202, 203 . . . could all be conventional EEPROMS, i.e. chips into which normal write access is possible. Naturally, it is equally well possible, that each chip 201, 202, 203, . . . has a first section that is protected, and a second section, that is not protected, where for example the addresses in section 11 of processor 1 point to an address in the protected part of chip 201, and this protected part of chip 201 in turn points to other protected parts of the other chips 202, 203, . . . . In the latter case, all of the protected sections of the chips 210, 202, 203, . . . would together constitute the protected part of the memory means described in the claims.

Figure 3A:
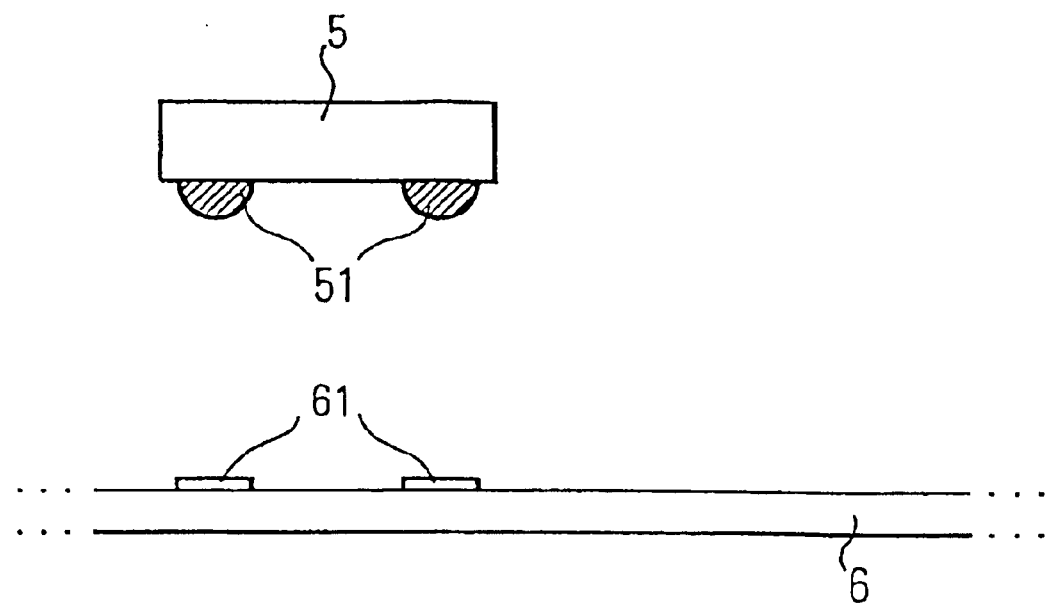
FIGS. 3a and 3b show a preferred memory device to be used in the data processing device of the present invention.
Figure 3B:
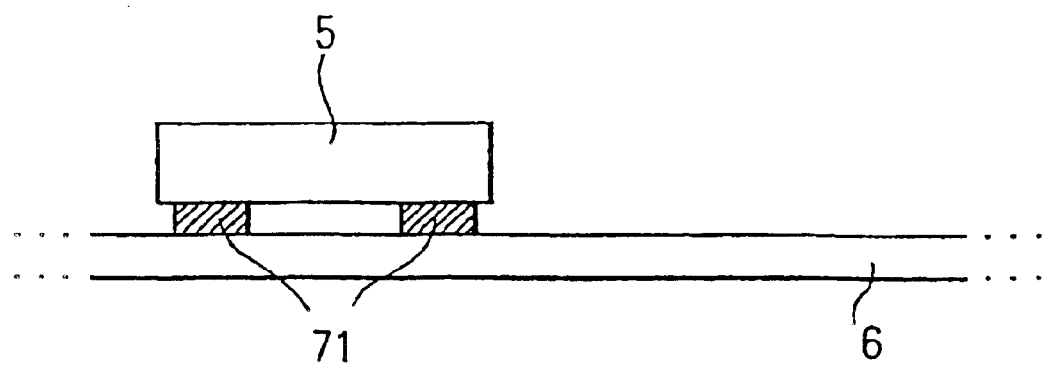

It may be noted, that although the above-described embodiments relate to a system in which the memory has a protected part into which data cannot be written, it is still possible to read out the data in the protected section, even for an unauthorized user. In order to make this more difficult for an unauthorized user, a preferred embodiment of the memory in the data processing device of the present invention is shown in FIGS. 3a and 3b. FIGS. 3a and 3b show a memory chip 5 having electrical contacts 51 that are to be soldered or otherwise connected to electrical leads 61 on a circuit board 6. FIG. 3a shows the components before mounting and FIG. 3b shows the arrangement after the memory chip 5 has been mounted onto circuit board 6, where the electrical contacts 51 and electrical leads 61 have been unified into contacts 71. It may be noted that the representation of FIG. 3b is exaggerated in the sense that in reality the distance between memory chip 5 and circuit board 6 will be very small, such that there is practically no possibility of accessing the contacts 71 while the chip 5 is mounted on the board 6.

Therefore, as indicated in FIG. 3, the electrical contacts 51 are such that the resulting contacts 71 are completely covered by the chip 5 after said chip has been mounted on the circuit board, to thereby make it impossible to access the electrical contacts 51 from the outside. For example, the contacts 51 can be small semi-spheres arranged in so-called ball-grid array.

By using the arrangement of FIG. 3, it is possible to avoid that an unauthorized user can pick up the signal passing through the contacts during the operation of the memory chip, such that a monitoring of the signals going in and coming out of the memory chip 5 during operation necessitates dismounting the chip from the circuit board and then providing corresponding replacement connections. This is a complicated and tedious procedure that may be expected to let any prospective unauthorized user shy away from attempting to monitor the signals between the memory and the remaining circuits. It may be noted that even though it is possible to read out data from protected section 21 after having dismounted the memory chip 5 from the circuit board 6, it will nonetheless be a very complicated and tedious procedure to re-mount the chip onto the circuit board, because such mounting procedures are performed by high-precision machines during manufacturing, i.e. the spacing between contacts is typically very small.

Naturally, the connections between the memory and the processor on the circuit board should also be hidden in an appropriate fashion, e.g. in such a way that an attempt to access them requires destroying the circuit board, and the electrical contacts to the processor should also be inaccessible, e.g. with the help of the measures described above in connection with the memory.

As already mentioned, the present invention provides an arrangement in which a fairly high amount of data security can be achieved in an inexpensive way. A preferred application of the data processing device of the invention is in communications devices. Such communications devices can e.g. be mobile telephones. A specifically preferred application of the data processing device is to communication devices adhering to the so-called Bluetooth technology. Bluetooth technology is designed to enable users to connect their mobile computers, digital cellular phones, handheld devices, network access points and other mobile devices via wireless short-range radio links unimpeded by line-of-sight restrictions. Eliminating the need for proprietary cables or for line-of-sight communication via IR-links to connect devices, Bluetooth technology increases the ease and breadth of wireless connectivity. Bluetooth operates in the 2.45 GHz ISM "free band". Details on this technology may be found e.g. at http://www.bluetooth.com.

The present invention has been described by way of examples, but it shall be understood that these examples only serve to clearly present the invention to a skilled person and do not intend to restrict the scope of the invention in any way. Much rather, the scope of the invention is determined by the appended claims.

What is claimed is:

1. Device for processing data, comprising:
   a processor for executing program routines, and a memory for storing program routines to be executed by said processor, where
   at least a part of said memory is arranged as a protected part from which data can be read but which is protected against being written into, where said protected part is arranged such that a mechanism is provided such that after data is initially stored in said protected part, any subsequent writing of data into said protected part is irreversibly blocked, and
   said processor is arranged to necessarily execute a security program routine stored in said protected part of said memory upon start-up.

2. Device according to claim 1, wherein said processor stores permanent start addresses that are necessarily called upon start-up of said processor, where at least one of said start addresses points to said protected part of said memory.

3. Device according to claim 1, wherein said protected part of said memory is a first part, and said memory further comprises a second part into which data can be written, where the security program routine from said protected part executed by said processor upon start-up comprises checking for changes in at least a part of the data contained in said second part.

4. Device according to claim 3, wherein said security program routine from said protected part executed by said processor upon start-up comprises calculating a characteristic parameter for data being checked for changes, and comparing said characteristic parameter with a value stored in said second part of said memory at the time of writing said data being checked for changes into said second part of said memory.

5. Device according to claim 4, wherein said characteristic parameter is a check sum.

6. Device according to claim 1, wherein said memory comprises a plurality of memory devices, one of which comprises said protected part, and the rest of which are arranged such that data may be written into them.

7. Device according to claim 1, wherein said protected area is arranged such that the process for storing data therein comprises:

writing data into said protected part via a write line, and sending a signal to said protected part in response to which said write line is permanently interrupted.

8. Device according to claim 7, wherein said write line is a fusable link.

9. Device according to claim 1, wherein said memory comprises a finite state machine, said finite state machine defining a state which protects said protected part from being written into.

10. Device according to claim 1, wherein said memory comprise one or more of an EEPROM, a flash memory device, and a flash memory device emulating an EEPROM.

11. Device according to claim 1, wherein said memory comprises a memory chip having electrical contacts for being connected with a circuit board that are arranged such that said electrical contacts are covered by said memory chip when said memory chip is mounted on said circuit board.

12. Device according to claim 11, wherein said electrical contacts are provided in a ball-grid-array.

13. Communication device comprising a device for processing data according to claim 1.

14. Communication device according to claim 13, wherein said communication device is a mobile telephone.

15. Communication device according to claim 13, wherein said communication device is a bluetooth communication device.

16. Method for controlling a data processing device having a processor for executing program routines and a memory for storing program routines to be executed by said processor, comprising:

arranging at least a part of said memory as a protected part from which data can be read but which is protected against being written into;

after data is initially stored in said protected part, irreversibly blocking any subsequent writing of data into said protected part; and said processor necessarily executing a security program routine stored in said protected part of said memory upon start-up.

17. Method according to claim 16, wherein said processor stores permanent start addresses that are necessarily called upon start-up of said processor, where at least one of said start addresses points to said protected part of said memory.

18. Method according to claim 16, wherein said protected part of said memory is a first part, and said memory further comprises a second part into which data can be written, where the security program routine from said protected part executed by said processor upon start-up comprises checking for changes in at least a part of the data contained in said second part.

19. Method according to claim 18, wherein said security program routine from said protected part executed by said processor upon start-up comprises calculating a characteristic parameter for data being checked for changes, and comparing said characteristic parameter with a value stored in said second part of said memory at the time of writing said data being checked for changes into said second part of said memory.

20. Method according to claim 19, wherein said characteristic parameter is a check sum.

21. Method according to claim 16, wherein said memory comprises a plurality of memory devices, one of which comprises said protected part, and the rest of which are arranged such that data may be written into them.

22. Method according to claim 16, wherein said protected area is arranged such that the process for storing data therein comprises:

writing data into said protected part via a write line, and sending a signal to said protected part in response to which said write line is permanently interrupted.

23. Method according to claim 22, wherein said write line is a fusable link.

24. Method according to claim 16, wherein said memory comprises a finite state machine, said finite state machine defining a state which protects said protected part from being written into.

25. Method according to claim 16, wherein said memory comprises one or more of an EEPROM, a flash memory device, and a flash memory device emulating an EEPROM.

26. Method according to claim 16, wherein said memory comprises a memory chip having electrical contacts for being connected with a circuit board that are arranged such that said electrical contacts are covered by said memory chip when said memory chip is mounted on said circuit board.

27. Method according to claim 26, wherein said electrical contacts are provided in a ball-grid-array.

28. A medium readable by a data processing device, having a program recorded thereon, where the program is to make the data processing device execute the method of claim 16.

* * * * *